United States Patent [19]

Toda et al.

[11] Patent Number: 5,526,165
[45] Date of Patent: Jun. 11, 1996

[54] SCANNER SYSTEM

[75] Inventors: Akitoshi Toda, Tokyo; Shuichi Ito, Sagamihara; Hirofumi Miyamoto, Tokyo; Akira Yagi, Sagamihara, all of Japan

[73] Assignee: Olympus Optical Co., Ltd., Tokyo, Japan

[21] Appl. No.: 386,225

[22] Filed: Feb. 9, 1995

Related U.S. Application Data

[63] Continuation of Ser. No. 109,365, Aug. 19, 1993, abandoned.

[30] Foreign Application Priority Data

Aug. 21, 1992 [JP] Japan .................. 4-222902
Dec. 9, 1992 [JP] Japan .................. 4-329407

[51] Int. Cl.⁶ .................................. G02B 26/08
[52] U.S. Cl. .................. 359/202; 359/198; 359/212; 359/224; 250/234
[58] Field of Search ................... 359/201–202, 359/212–214, 368–369, 371, 391, 393, 224, 197–199; 250/201.1, 561, 234, 235, 306, 307; 356/373, 375; 318/640

[56] References Cited

U.S. PATENT DOCUMENTS 5,172,002 12/1992 Marshall .................. 250/561
5,210,410 5/1993 Barrett .................. 250/234

FOREIGN PATENT DOCUMENTS 56-7246 1/1981 Japan .
62-130302 6/1987 Japan .

OTHER PUBLICATIONS

Article entitled Optical Scan–Correction System Applied to Atomic Force Microscopy, by R. C. Barrett and C. F. Quate, Rev. Sci. Instrum. 62(6), Jun. 1991, American Institute of Physics, pp. 1393–1399.

Primary Examiner—James Phan
Attorney, Agent, or Firm—Frishauf, Holtz, Goodman, Langer & Chick

[57] ABSTRACT

A scanner system includes, a tube type piezoelectric scanner having a free end displaceable in X, Y and Z directions and supporting a sample at its free end, a driver for applying voltages to the scanner for displacing the sample, an optical unit for optically detecting the X, Y and Z direction displacements of the free end and for outputting corresponding displacement signals, and a scan controller for computing correction signals based on the displacement signals so as to apply voltages which correct the voltage-displacement nonlinear characteristic of the scanner to the scanner and for supplying them to the driver.

25 Claims, 13 Drawing Sheets

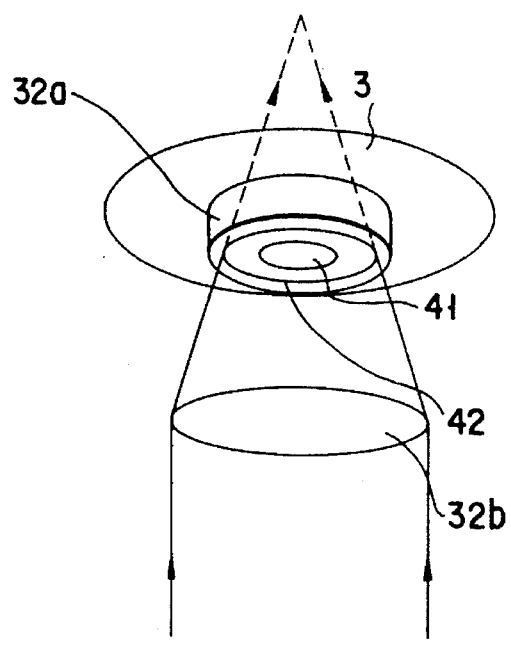
F I G. 5A
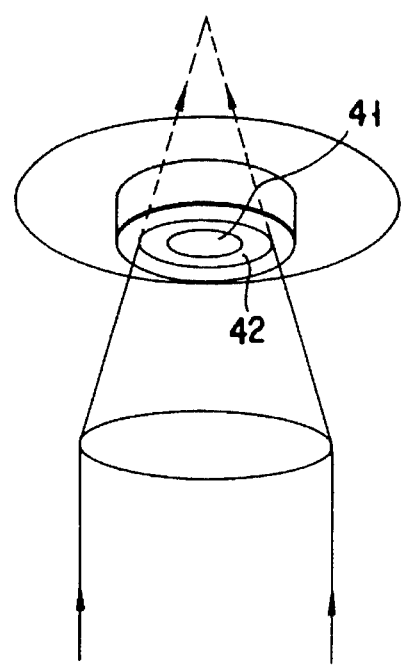
F I G. 5B
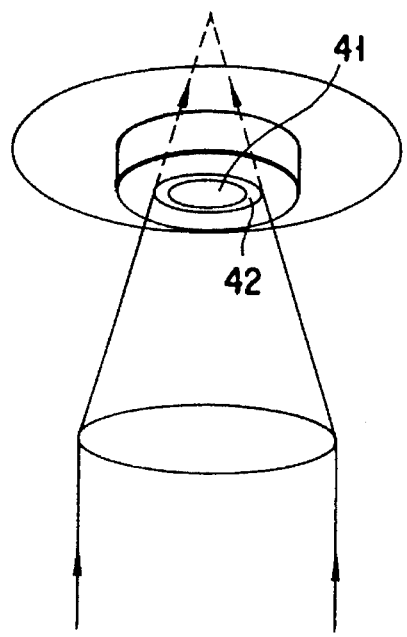
F I G. 5C

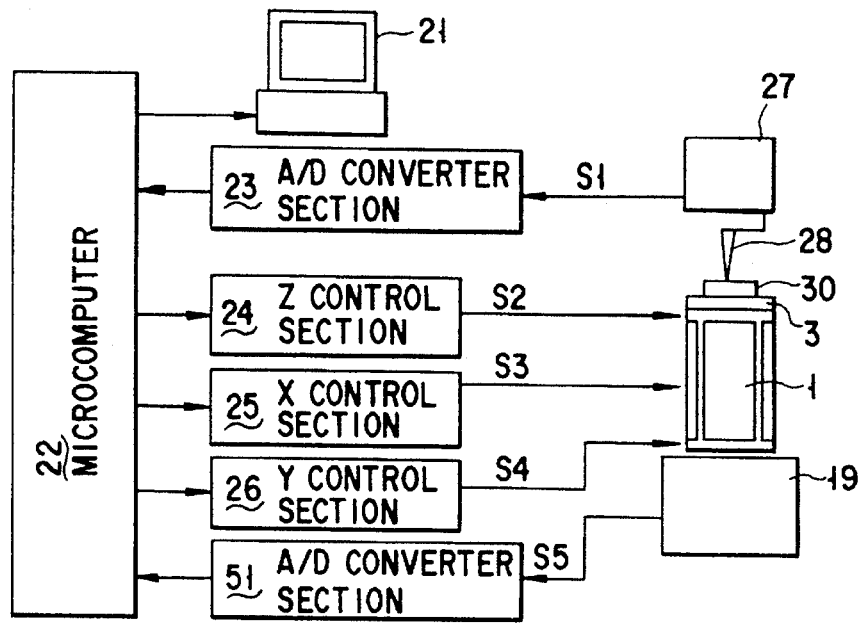
F I G. 6
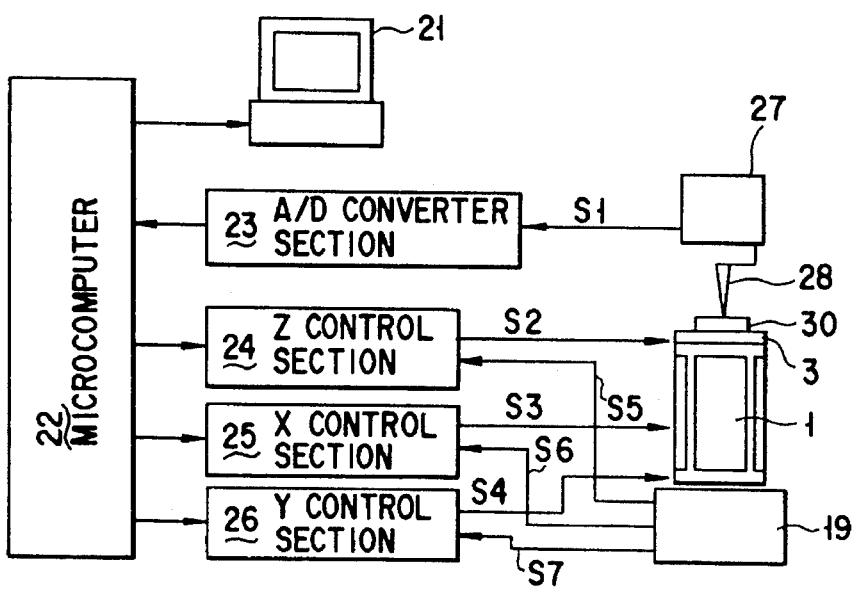
F I G. 8

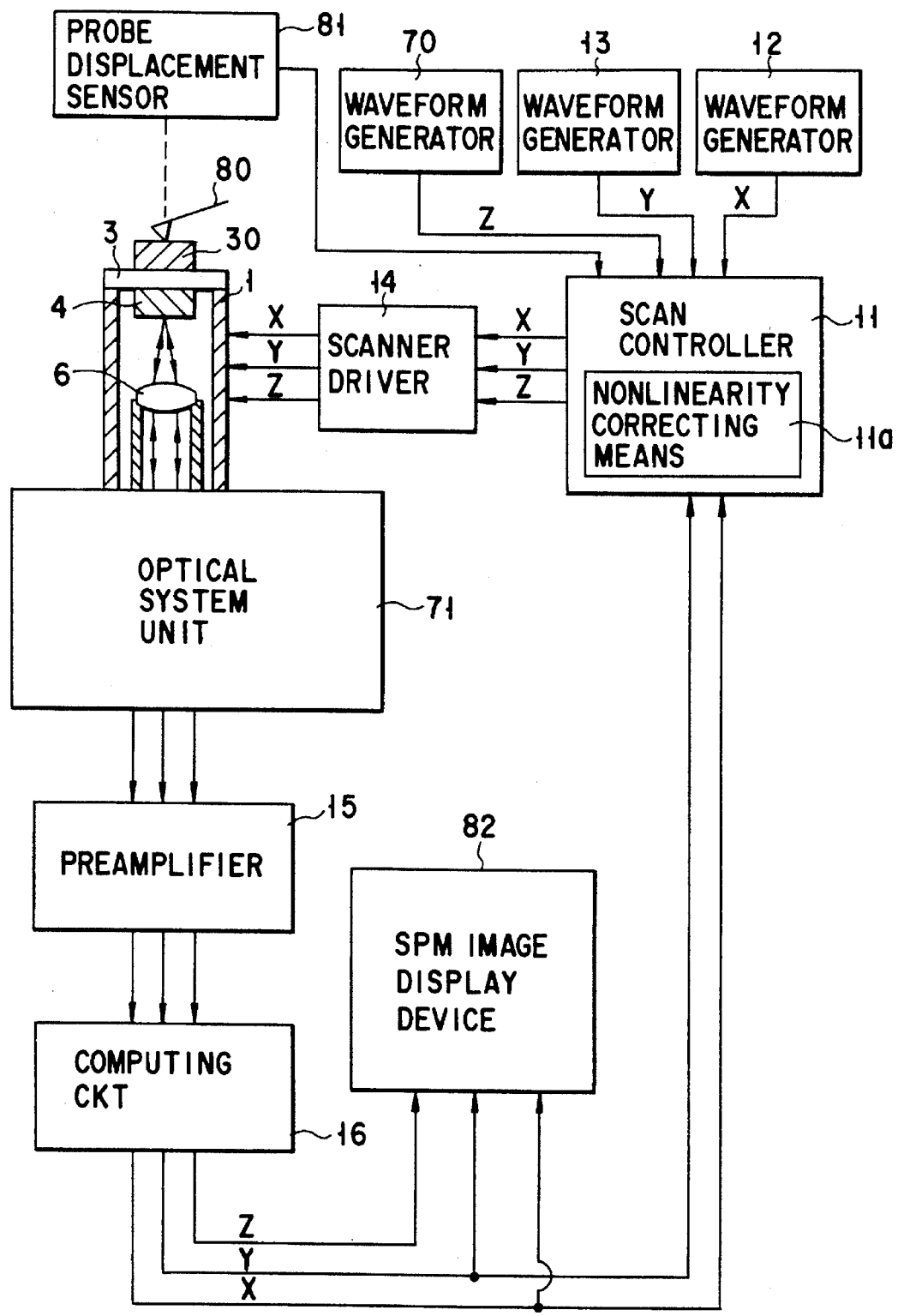
F I G. 11

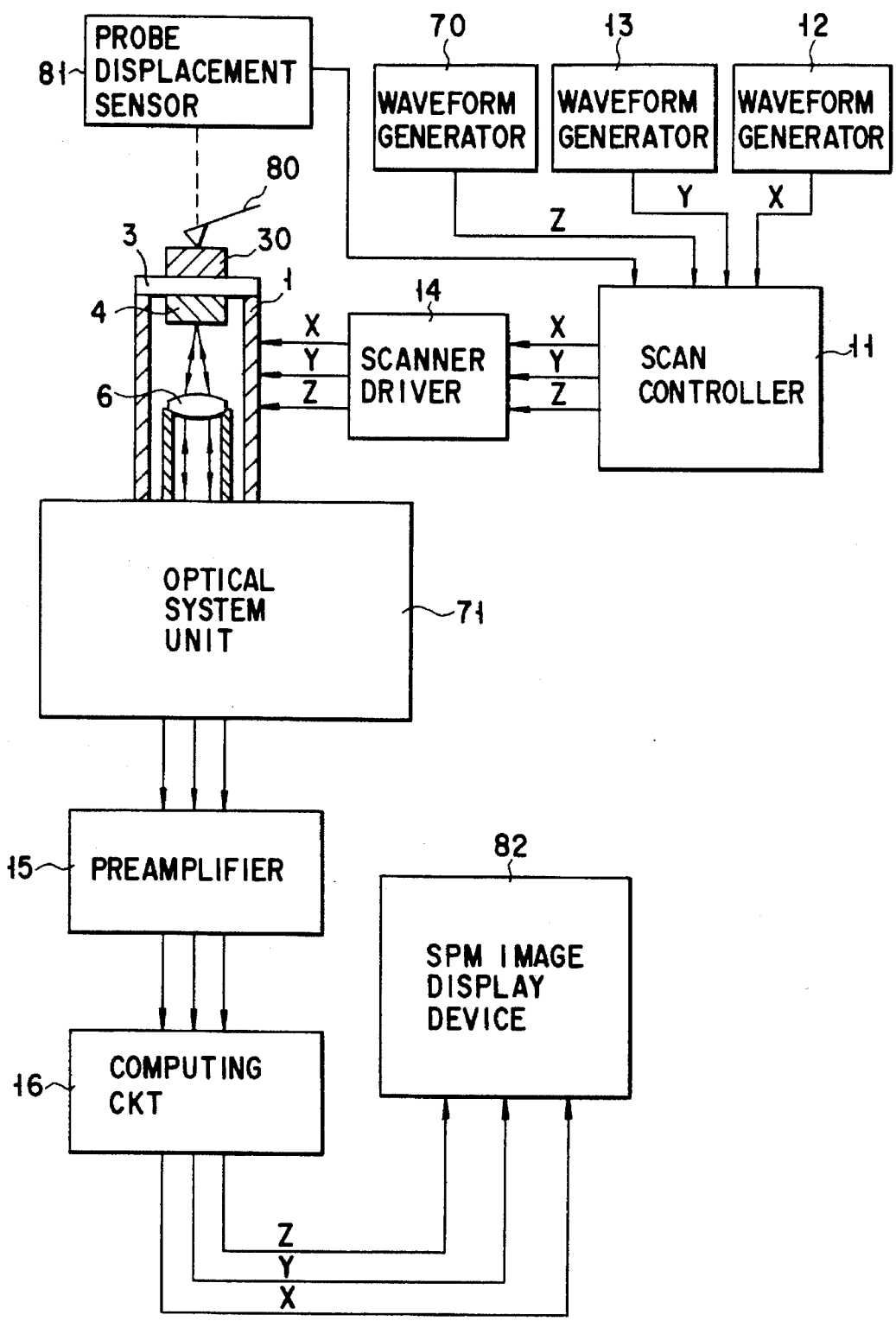
F I G. 13

SCANNER SYSTEM

This application is a continuation of application Ser. No. 08/109,365, filed Aug. 19, 1993, now abandoned.

BACKGROUND OF THE INVENTION

1. Field of the Invention

The present invention relates to a scanner system, applied to such as a scanning type probe microscope, for example, a scanning tunneling microscope (STM) and atomic force microscope (AFM), for scanning a probe and a sample relative to each other.

The "Method and Apparatus for Forming Image on Sample Surface" emerging, for example, in Jpn Pat. Appln. KOKAI Publication No. 62-130302 proposes a scanning type probe microscope, such as a scanning tunneling microscope (STM) and atomic force microscope (AFM), having a simple arrangement with a high length/width resolution in an atomic size level.

In order to achieve such a scanning probe microscope, a system is required which can accurately control a relative probe-to-sample position. Generally use has been made of a tripod- and a tube-type piezoelectric scanner using a piezoelectric body in a scanner system.

The tube type piezoelectric scanner (tube scanner) has a single common electrode on the inner wall surface and four, circumferentially spaced-apart, separate drive electrodes on the outer peripheral surface of the tube-like piezoelectric body. By applying voltages to the four electrodes under proper control, the free end of the piezoelectric body can be three-dimensionally displaced due to its bending, extension/contraction, etc. By fixing a stage to the free end of the piezoelectric body and supporting a probe or a sample on the stage, the sample is scanned by the probe through a displacement at the end of the piezoelectric body.

It is well known that the piezoelectric body manifests a phenomenon, such as a hysteresis, creeping, etc., upon displacement by a voltage drive. In the case where the probe or the sample is scanned by the piezoelectric scanner, the moving characteristic of the stage, that is, the probe or the sample, becomes nonlinear (voltage-displacement nonlinear characteristic). Such a nonlinearity emerges as a distortion in an observation image in the scanning type probe microscope, thus providing a bar to the quantitative measurement.

SUMMARY OF THE INVENTION

It is accordingly the object of the present invention to provide a scanner system which can perform a proper scanning by eliminating an adverse effect resulting from a hysteresis, creeping, etc., caused by the displacement of a piezoelectric body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A to 5C are views for explaining the operation of the Z direction displacement detecting mechanism in FIG. 4;

FIG. 6 is a view for explaining a scanning type probe microscope according to a third embodiment of the present invention;

FIG. 8 is a diagrammatic view showing a scanning type probe microscope according to a fourth embodiment of the present invention, the operation principle being based on that shown in FIGS. 7A to 7C;

FIG. 11 is a diagrammatic view showing an apparatus according to a sixth embodiment applied to an atomic force microscope;

FIG. 13 is a diagrammatic view showing an apparatus applied to another atomic force microscope;

FIG. 14A corresponding to its general arrangement; FIG. 14B, a plan view showing a first position detector; and FIG. 14C, a plan view showing a second position detector;

DETAILED DESCRIPTION OF THE PREFERRED EMBODIMENTS

A first embodiment of the present invention will be explained below with reference to the accompanying drawings.

Figure 1:
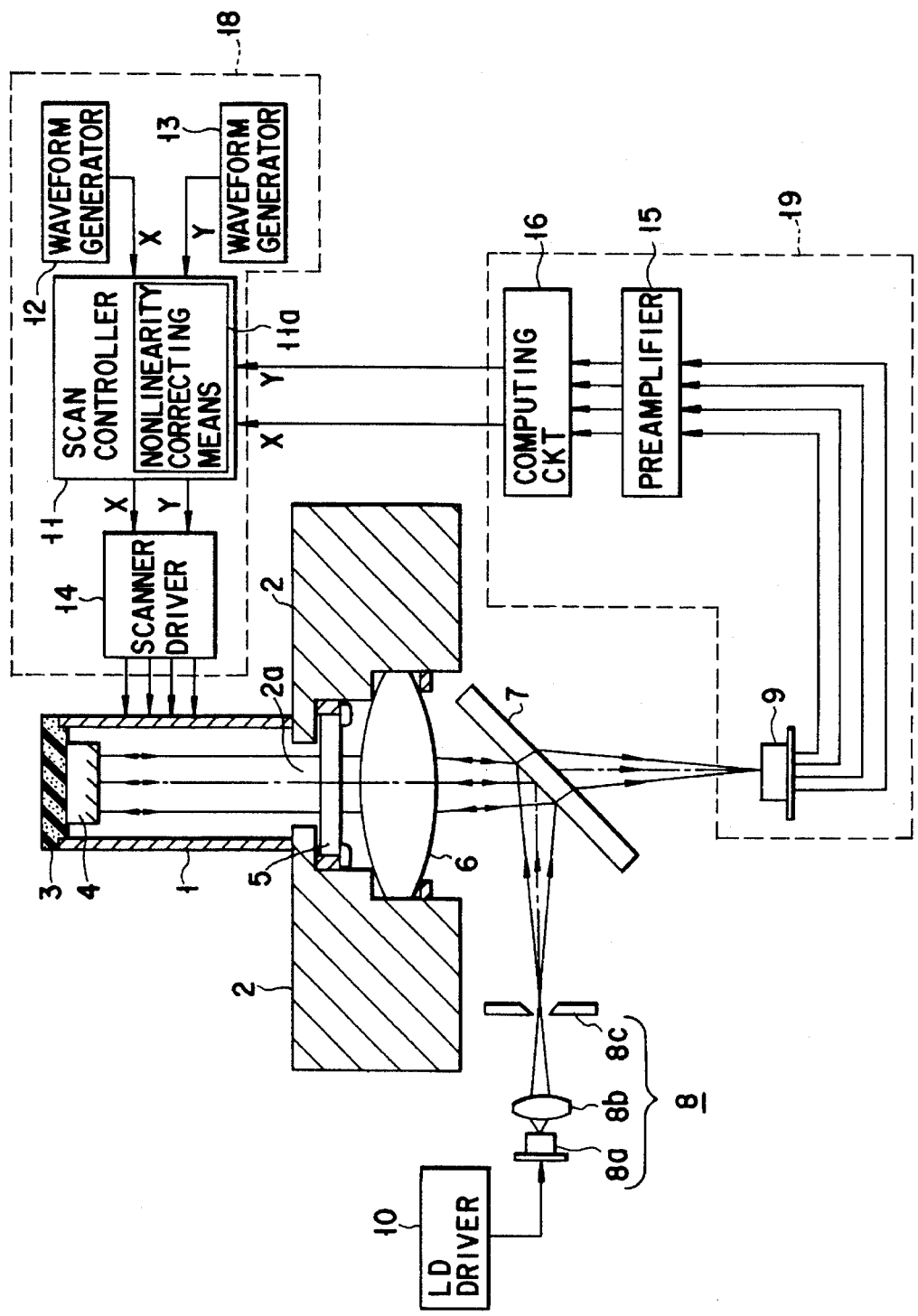
FIG. 1 is a diagrammatic view, partly broken away, showing a scanner system according to a first embodiment of the present invention.

FIG. 1 is a view, partly broken away, showing a general arrangement of a scanner system according to the first embodiment. In FIG. 1, reference numeral 1 shows a tube type piezoelectric scanner (hereinafter referred to as a scanner). The scanner 1, though being shown omitted in its detailed arrangement, comprises a piezoelectric body made up of a cylindrical tube opened at each end with a single common electrode formed on its inner wall surface and four drive electrodes circumferentially formed on its outer peripheral surface. The scanner 1 is fixed at its lower end on a fixed base 2. At the upper or free open end of the scanner 1, a stage 3 is provided such that it cover the upper open end of the scanner. The stage 3 is so formed as to have accurately parallel upper and lower surfaces. A plane mirror 4 is provided on the lower surface of the stage 3 with its reflection surface down. A through bore 2a extends from the upper surface to the lower surface of the fixed base 2 in a coaxial relation to the scanner 1. A quarter-wave plate 5 and collimator lens 6 are located in the through hole 2a with their optical axes aligned with the optical axis of the plane mirror 4. The quarter-wave plate 5 and collimator lens 6 are fixed relative to the stage 3 with the plate 5 located at an upper small-diameter section and the collimator lens 6 located at a lower large-diameter section of the through bore 2a. A polarizing beam splitter 7 is located below the collimator lens 6 and supported by a supporting means, not shown. A position detector 9 as will be set out below is arranged below the polarizing beam splitter 7. A light source 8 is arranged at a lateral side of the polarizing beam splitter 7 and the polarizing beam splitter 7 reflects, toward the plane mirror 4, a light beam emitted from the light source 8 and having a component having a specific oscillation plane. The polarizing beam splitter 7 allows the light beam which is returned back to be transmitted and conducts it to the position detector 9.

The light source 8 comprises a semiconductor laser 8a, a lens 8b arranged on the exit side of the semiconductor laser 8a and a special filter 8c. A light beam emitted from the semiconductor laser 8a is focused, by the lens 8b, at an aperture of the special filter 8c. The light beam transmitted through the special filter 8c is incident, as a diverged beam, in the polarizing beam splitter 7.

In FIG. 1, reference numeral 10 shows an LD driver electrically connected to the semiconductor laser 8a, driving the semiconductor laser for emitting a laser beam.

The position detector 9 has its light receiving surface positioned relative to the focal plane of the lens 6, that is, positioned at an equal optical distance to the special filter 8c from the lens, and allows a condensing light spot to be formed on the light receiving surface by the light beam transmitted through the polarizing beam splitter 7. The position detector 9 detects the position of the condensing light spot.

Reference numeral 11 shows a scan controller having a nonlinearity correcting means 11a as will be set out below. The outputs of first and second waveform generators 12, 13 and computing circuit 16 are connected to the input sides of the scan controller 11. A predetermined processing is conducted on an X-direction reference voltage generated at the first waveform generator 12 and Y-direction reference voltage generated at the second waveform generator 13 to generate X- and Y-direction control signals, noting that the predetermined processing includes the processing for feedback control as will be set out below, processing for rotating or displacing the motion of the scanner 1 from the X and Y direction, etc. The X- and Y-direction control signals are supplied to a scanner driver 14 on the output side of the scan controller 11. The scan controller 11, first and second waveform generators 12 and 13 and scanner driver 14 constitute a scanner drive/control section 18.

The output side of the scanner driver 14 is connected to the scanner 1 and voltages are selectively applied to four drive electrodes in the scanner 1 so as to displace the scanner 1 to a designated state by a control signal supplied.

A preamplifier 15 is connected between the output side of the position detector 9 and the input side of the computing circuit 16 to amplify the output signal, that is, a spot position indicating signal, of the position detector 9, for supply to the computing circuit 16. The computing circuit 16 finds the displaced state of the scanner 1 from an output version of the output signal of the position detector 9 and supplies a displacement signal representing the displaced state to the scan controller 11.

The nonlinearity correcting means 11a in the scan controller 11 imparts a predetermined correction to the generated control signal on the basis of the displacement signal supplied from the computing circuit 16.

Figure 2:
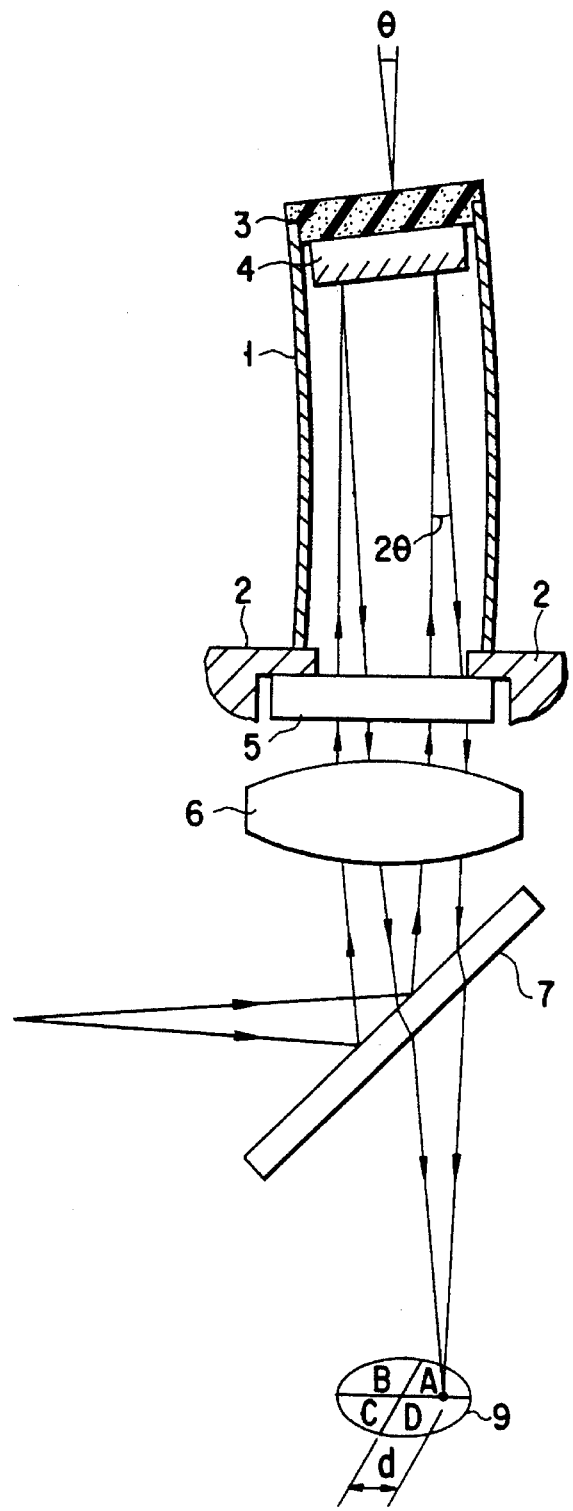
FIG. 2 is a view showing an optical system unit of the scanner system in FIG. 1 with a scanner distorted.

The position detector 9 comprises a known four-divided photodetector, that is, a photodetector having four areas A, B, C and D in a vertical light receiving surface with a cross hair as a boundary, as shown in FIG. 2, so as to obtain an electrical signal corresponding to an amount of intensity of light incident on each area. The position detector 9, preamplifier 15 and computing circuit 16 constitute a scanner displacement detecting section 19.

The operation of the scanner system so constructed will be explained below.

First, in a state in which a voltage is applied to neither of the four drive electrodes in the scanner 1, the scanner 1 is not displaced and placed in a reference state. When a voltage is selectively applied to the four drive electrodes in the scanner 1 on the basis of a control signal output from the scan controller 11, a displacement corresponding to the state of the voltage applied occurs at the scanner 1.

A divergent beam, transmitted through the special filter 8c of the light source 8 and having a linearly polarized light component in one direction, is reflected by the polarizing beam splitter 7 and is incident into the lens 6. At the lens 6, the incident divergent light beam is turned into parallel beams and incident into the quarter-wave plate 5 where the linearly polarized light component of the incident beam is turned into a circularly polarized component. The light beam having a circularly polarized light component enters the scanner 1 past the through bore 2a of the fixed base 2 and is incident onto the plane mirror 4.

The light beam is thus incident on a measurement point which is on a reflection surface of mirror 4. The incident light beam is reflected by the plane mirror 4 and again incident into the quarter-wave plate 5 where the light beam exits as a light beam having a linearly polarized light component 90° rotated in its azimuthal relative to the linearly polarized light component of the light beam incident into the quarter-wave plate 5 after being reflected by the beam splitter 7. The exiting parallel light beams, while being converged by the lens 6, pass through the polarizing beam splitter 7 and is incident onto the position detector 9 where a focusing light spot is formed on the light receiving surface of the position detector 9.

Here with the scanner 1 not displaced the focusing light spot is formed at a center on the light receiving surface of the position detector 9, that is, the light beam of an equal amount falls on the four areas A, B, C and D.

With the scanner displaced, for example, as shown in FIG. 2, on the other hand, the plane mirror 4 is tilted relative to the optical axis of the light beam entering the scanner 1, for example, the plane mirror 4 is tilted with a Y axis as a center when the scanner 1 is displaced in the X direction. As a result, the light beam is obliquely incident onto the plane mirror 4 and reflected at a corresponding tilt angle. Stated in more detail, in the case where the forward end of the scanner 1 is tilted at an angle of θ relative to the reference state, the light beam incident on the plane mirror 4 is reflected at an angle of 2θ relative to the incident light beam.

In the case where, after being linearly polarized by the quarter-wave plate 5, the light beam coming as a reflected beam from the plane mirror 4 is incident past the lens 6 and beam splitter 7, while being focused, on the light receiving surface of the position detector 9 where it is formed as a focusing light spot, the focusing spot is displaced off the center of the position detector 9 according to the direction in which the plane mirror 4 is tilted, because the light beam is reflected on the plane mirror 4 at an angle of 2θ relative to the incident light beam.

Here a relation $$d(\theta)=f\cdot\tan(2\theta)=2\cdot f\cdot\theta \quad (1)$$

between the displacement d of a spot formed on the detection detector 9 and the tilt angle θ of the plane mirror 4. In this equation, f denotes a focal distance of the lens 6.

Similarly, if the scanner 1 is displaced in the Y direction, then the plane mirror 4 is tilted with the x axis as a center and, if at this time the tilt angle is given as φ, then the displacement in the Y direction is given by:

$$d(\theta)=f\cdot\tan(2\theta)=2\cdot f\cdot\phi \quad (2)$$

By detecting the displacement d of the spot formed on the position detector 9 in comparison with the incident amount of light on the respective areas A, B, C and D it is possible to find the tilt angles θ and φ of the plane mirror 4 based on Equations (1) and (2). Since the direction in which the spot is displaced corresponds to the direction in which the plane mirror 4 is tilted, the computing circuit 16 finds the tilt direction of the plane mirror 4 on the basis of the output signals of the position detectors 9. The computing circuit 16 also finds the tilt angles θ and/or φ, through computation, on the basis of the output signal of the position detector 9. In this way the computing circuit 16 specifically determines the tilt angles (θ, φ) of the plane mirror 4 and tilt directions, that is, the tilt angles and tilt directions of the stage 3 and the state of the stage 3 is detected.

The computing circuit 16 converts the found information to monitor signals representing the X- and Y-direction displacements of the stage 3 and supplies these signals to the scan controller 11. To be specific, with the light receiving information items of the four light receiving areas of the position detector 9 given by A, B, C and D, the monitor signals dx and dy are obtained based on the equations $$dx=(A+D)-(B+C) \quad (3)$$

$$dy=(A+B)-(C+D) \quad (4)$$

and supplied to the scan controller 11.

Based on reference waveforms output from the first and second waveform generators 12 and 13, the scan controller 11 generates X- and Y-direction control signals for the stage 3 to be displaced to a predetermined state and, while, in this state, allowing the monitor signals to be monitored by the nonlinearity control means 11a, finds a deviation between a current desired state of the stage and an actual state of the stage 3 represented by the monitor signals. Since, between the desired state of the stage 3 and the actual state of the stage, a deviation occurs due to a hysteresis, creeping, etc., resulting from the displacement of the piezoelectric body of which the scanner 1 is formed, the nonlinearity correcting means 11a finds the deviation and varies control signals for compensating for the deviation. That is, in order to make, at a desired state, the actual state of the stage 3 found by the computing circuit 16, feedback control is carried out.

According to the present invention, since the actual state (tilt angles and tilt directions) of the stage 3 is optically detected and the feedback control is performed so as to make the stage 3 at that desired state, even if the hysteresis, creeping, etc., are produced due to the displacement of the piezoelectric body (scanner 1), it is possible to prevent the displacement of the stage 3 from being affected and to better control the state of the stage 3.

Stated in more detail, a system was constructed using a 15 mm-long tube scanner with four electrodes and a X5-amplification object lens (focal distance 35.9 mm) for a microscope and the scanner 1 was driven at a 200 V voltage, noting that the object lens was used as the lens 6. Compared with the result of measurement on the X-direction deviation with the use of another displacement gauge and displacement angle gauge, the tilt angle θ of the stage 3 was 0.35 seconds relative to the X-direction displacement of the scanner 1 and stage tilt 1.3 μm. As appreciated from Equation (1), the displacement d was 0.12 μm as a displacement of the spot formed on the position detector 9. Using this data as a reference, feedback control was carried out and it was possible to achieve an XY operation free from any hysteresis.

In the STM and AFM, the stage 3 is varied in a Z-direction (up/down direction in FIG. 1), but, according to the embodiment, since parallel light beams are incident onto the plane mirror 4, it is possible to detect the displacement of the stage only in the X and Y directions without being affected by the Z-direction as seen from Equations (1) and (2).

Since according to the embodiment, the displacement of the stage 3 is optically detected, stable detection is ensured without involving any noise resulting from the drive voltage, etc., of the scanner 1. If use is made of a magnetism sensor and capacity sensor, there is a fear that noise will be involved due to the affect of the drive voltage, etc., of the scanner 1 which is considerably high in level.

In the present embodiment, no light interference is utilized for detecting the displacement of the stage 3. For the utilization of the light interference the number of crests of a sinusoidally varying sensor—light intensity is counted for a displacement exceeding one wavelength or one-half wavelength, but a count miss, etc., are unavoidable for the case where the scanner 1 involves a rapid displacement due to the use of an increment system, thus producing a cause for an error. It is possible, according to the present embodiment, to avoid such an error.

The present invention is not restricted to the aforementioned embodiment. In the present embodiment, the feedback control is performed but, for the case of an STM and AFM for example, X–Y coordinates are newly prepared so as to meet the monitor signals coming from the computing circuit 16. In this case, image processing is performed with STM signals and AFM signals rearranged on the X–Y coordinates. In this way it is also possible to achieve the object of the present invention.

In the present invention, although the semiconductor laser 8a is arranged as the light source 8, it is also possible to use an LED and other proper light emitting means.

For the case of the LED, there occurs no bad effect resulting from an interference and it is possible to omit the quarter-wave plate 5 and to use a half-mirror in place of the polarizing beam splitter 7 and hence to obtain a simple arrangement.

It is preferable that the XY operation direction of the scanner 1 correspond to the XY direction of the position detector 9. If there is no correspondence between both, it is necessary to perform processing on the output signals of the position detector 9 for a reconstion to be achieved.

The scanner system of the present embodiment comprises reflecting means, such as a plane mirror, provided on the stage; light source means comprising, for example, a light source, beam splitter and quarter wave plate to allow parallel beams to be incident onto the reflecting means; light focusing means, such as a lens, for focusing a reflecting light beam coming from the reflecting means and for forming a spot on a predetermined surface; spot detecting means, such as a position detector, arranged on the predetermined surface to detect the position of the spot on the predetermined surface; and tilt angle computing means, such as a computing circuit, for finding the tilt angle of the stage on the basis of the position of the spot detected by the spot detecting means, whereby it is possible to eliminate an influence resulting from a hysteresis, creeping, etc., caused by the displacement of a piezoelectric body so that better scanning can be carried out.

Applying a scanner system according to a second embodiment of the present invention to an atomic force microscope (AFM) will be explained below with reference to FIGS. 3 to 5A–5C.

In the second and subsequent embodiments to be explained, the same reference numerals are employed to designate parts or members substantially corresponding to those shown in the first embodiment and no further explanation is omitted with the same reference numeral attached for brevity's sake.

Figure 3:
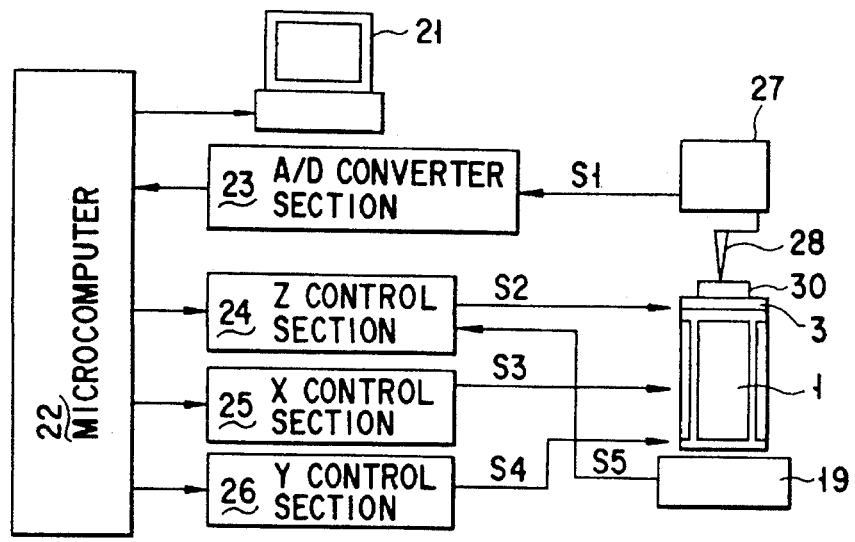
FIG. 3 is a view showing a scanning type probe used in a scanner system according to a second embodiment of the present invention.

FIG. 3 is a view showing an arrangement of a piezoelectric body displacement detecting system according to the second embodiment of the present application. As shown in FIG. 3, a host computer 21, Z control section 24, X control section 25 and Y control section 26 are connected to the output side of a microcomputer 22. To the output sides of the control sections 24 to 26 are connected corresponding electrodes of a scanner 1 of which a tube type piezoelectric body is formed for XYZ drive. These members constitute a scanner drive/control section. A sample 30, that is, to be measured object, is placed on a stage 3 which is supported on the scanner 1 and a cantilever 28 is provided over the sample 30. A probe is supported at the free end of the cantilever 28 such that the probe leaves a very small space over the upper surface of the sample 30. The cantilever 28 is connected to a cantilever displacement detecting section 27 so as to measure a z direction displacement, that is, an up/down direction displacement of the prove of the cantilever 28 and to generate an analog signal corresponding to the displacement. The output of the cantilever displacement detecting section 27 is connected to the input side of the microcomputer 22 through an A/D converter section 23.

The scanner displacement detecting section 19 is provided below the scanner 1 and connected at its output side to the input side of the Z control section 24. In this arrangement, the cantilever displacement detecting section 27 detects a Z-direction displacement of the probe by a atomic force acting between the sample and the probe corresponding to an uneven surface of the sample, that is, the corresponding displacement of the free end of the cantilever 28, and delivers a displacement signal S1 as an output signal to the microcomputer 22 through the A/D converter section 23. Based on the output signal the host computer 21 stores measurement data transferred from the microcomputer 22 and forms an image representing the surface state of the sample. Further the microcomputer 22 controllably makes measurement on the XYZ drive tube piezoelectric body 1 through the X and Y control sections 25 and 26, while allowing a two-dimensional scanning to be carried out, and transfers the measured data to the host computer 21 at the same time.

The microcomputer 22 expands/contracts the scanner 1 in the Z direction through the Z control section 24 on the basis of information read out of the A/D converter section 23. At this time, Z control is done so as to hold a displacement signal S1 at a predetermined value and to obtain corresponding Z-control data as measurement data. It is to be noted that, since the Z control section 24 enables a Z displacement signal which is detected from a scanner displacement detecting section 19 to be fed back, a relation of the scanner displacement to the Z control data is linearly compensated for by the microcomputer 22 so that Z direction uneven information is accurately reproduced as an image.

An optical system of a Z direction displacement detecting mechanism will be explained below with reference to FIG. 4.

Figure 4:
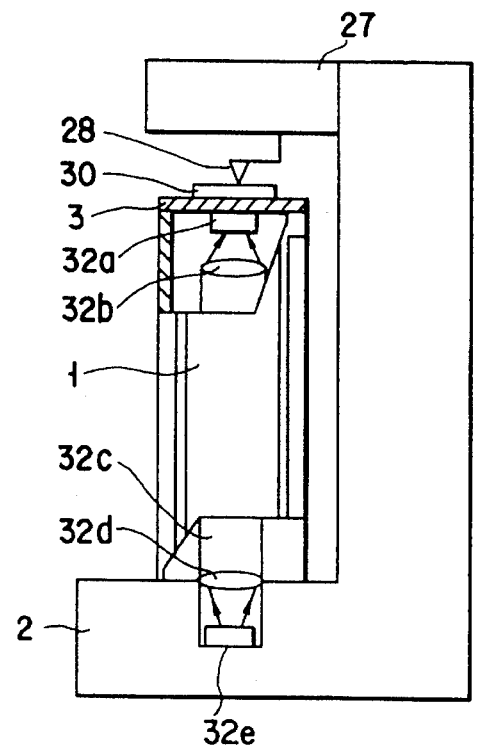
FIG. 4 is a view showing a Z direction displacement detecting mechanism in the system shown in FIG. 3.

As shown in FIG. 4, the scanner 1 is fixed to a fixed base 2 which provides a lower section, that is, a lower end, of a supporting body. The stage 3 is located on the upper end of the scanner 1. To the lower surface of the stage 3, a photodetector 32a is fixed with its light receiving surface down. A fixing hole is provided in the upper surface of the fixed base 2 such that the fixing hole is coaxial with the axis of the scanner 1. A laser diode 32e and collimator lens 32d are fixed in place in the fixing hole in a manner to be coaxial with the photodetector 32a. The laser diode 32e and collimator lens 32d are so formed that the light beam emitted from the laser diode 32e is converted to parallel beams which are in turn directed upward through the inside of the scanner 1.

An optical system support section 32c is provided in the scanner 1 in a manner to be coaxial with the scanner 1. A condensing lens 32b is mounted on the upper end side of the scanner 1 and confronts the overlying photodetector 32a. The condensing lens 32b is so aligned with the collimator lens 32d as to allow parallel beams which come from the collimator lens 32d to be focused at the photodetector 32a. The condensing lens 32b and photodetector 32a are so arranged at a predetermined distance as to be shorter than the focal length of the condensing lens 32b and, as shown in FIG. 5A, to allow a focused light spot 42 to be made greater than a light receiving surface 41.

In the system of the second embodiment, the photodetector 32a is added as a light receiving element to the upper end, that is, the free end, of the scanner 1 serving as a sample fine movement mechanism of a conventional scanning type probe microscope. Further added to the system are the laser diode 32e provided as a light source on the lower end side of the scanner and the collimator lens 32b for allowing laser light which is emitted from the laser diode 32e to be focused on the photodetector 32a. The light receiving surface of the photodetector 32a is so adjusted that it is displaced more inward than the focal position of the focusing lens 32b.

As in the case of the conventional system, in order to maintain the tip of the probe at a predetermined distance relative to the sample surface, the scanner 1 is extended/contracted by the Z direction control (Z servo) section 24 and it two-dimensionally XY scans the sample 30, while allowing the sample to be moved in the Z direction. At that time, a variation in amount of light detected by the photodetector 32a is turned into a variation in the extension/contraction of the scanner 1 and, when the amount of light detected at the photodetector 32a is imaged as uneven signals on the sample surface, it is possible to obtain accurate uneven information.

FIGS. 5A to 5C show a relation, to a focusing spot 42, of a light receiving surface 41 when the scanner 1 is extended/contracted in the Z direction.

FIG. 5A is a view showing a state when the scanner 1 is contracted in the Z direction; FIG. 5B, when the scanner 1 is placed at a normal length; and FIG. 5C, when the scanner 1 is expanded in the Z direction. As will be seen from the above, as the scanner 1 is expanded/contracted in the Z direction the diameter of the condensing light spot 42 varies and an amount of light, p, received at the light receiving surface 41 varies as the scanner is expanded/contracted. At this time, with Pa, Pb, Pc representing amounts of light at the states shown in FIGS. 5A to 5C, respectively, a relation Pa<Pb<Pc is established. Therefore the displacement of the scanner 1 in the Z direction can be detected from a variation in amounts of light received at the photodetector 32a.

A third embodiment of the present invention will be explained below with reference to FIG. 6.

The third embodiment is substantially similar to the second embodiment except that, instead of connecting the output of a scanner displacement detecting section 19 to a z control section 24, the output of the scanner displacement detecting section 19 is connected via a further A/D converter section 51 to a microcomputer 22.

The microcomputer 22 controls the scanner 1 to enable is to perform two-dimensional scanning through an X control section 25 and Y control section 26 and, while being so done, transfers to a host computer 21 displacement measurement data items sent via a cantilever displacement detecting section 27 and A/D converter section 23.

The microcomputer 22 enables the scanner 1 to be expanded/contracted in the Z direction through the Z control section 24 on the basis of information read out of the first A/D converter section 23. That is, Z control is so made as to hold a displacement signal at a predetermined value and corresponding Z control data is taken as measurement data. A Z displacement signal S5 measured at the scanner displacement detecting section 19 is output to the second A/D converter circuit 51. Z displacement data read out of the A/D converter section 51 is imaged as measurement data. It is possible, according to the present invention, to obtain the same advantage as that of the second embodiment.

A fourth embodiment of the present invention will be explained below with reference to FIGS. 7A to 7C and 8.

In this embodiment, as shown in FIG. 8, a scanner displacement detection section 19 and X, Y, Z-control sections are so constructed that a signal coming from the scanner displacement detecting section 19 is not only supplied to a Z control section 24 but also supplied, as signals S5 to S7, to the Z control section 24, X control section 25 and Y control section 26 so that these signals are fed back to these control sections, unlike in the embodiment shown in FIG. 3.

In the embodiment shown in FIG. 8, the Z displacement signal S5 detected from the scanner displacement detecting section 19 is fed back to the z control section 24 and the X and Y displacement signals S6 and S7 detected from the scanner displacement detecting section 19 are fed back to the X and Y control section 25 and 26, respectively. A relation of X, Y and Z control data to the scanner displacement is linearly compensated for and uneven information used as an image formation can also be accurately reproduced in three-dimensional fashion. It is to be noted that substantially the same advantage can also be obtained when the respective displacement signals S5, S6 and S7 are output directly to the A/D converter section and the A/D converted data is used as measurement data for image formation.

Figure 7A:
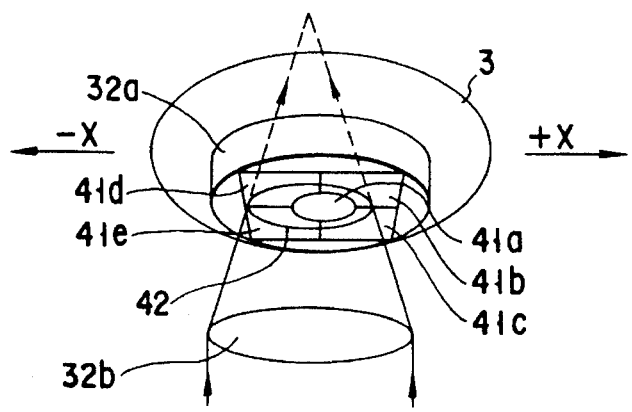
FIGS. 7A to 7C are views for explaining the operation of a scanning type probe microscope according to a fourth embodiment of the present invention, a light receiving surface and condensing light spot being shown in their positional relation.
Figure 7B:
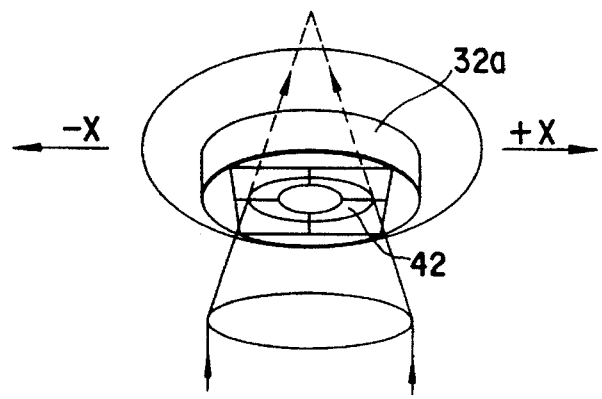
Figure 7C:
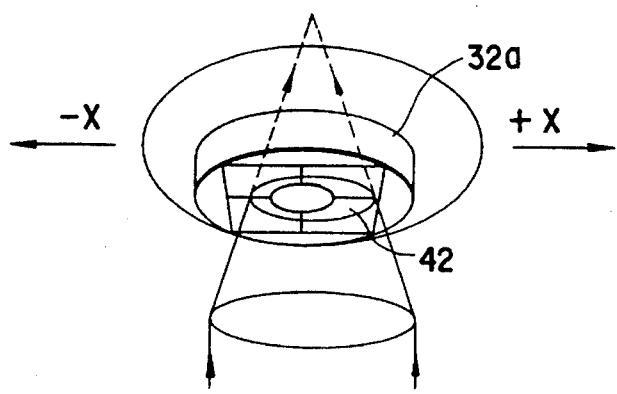

In this embodiment, as shown in FIGS. 7A to 7C, use is made, as a light receiving element, of a 5-divided photodetector 32a having a center light receiving area 41a with a light receiving surface located at a center and four marginal light receiving areas 41b to 41e located at marginal areas and arranged in symmetrical relation to the X and Y directions. The photodetector 32a is so set that, at any Z direction displacement state of the scanner 1, the focused light spot 42 is made smaller than its whole light receiving surface but greater than the center light receiving surface 41a.

In the XYZ scanning, a variation in amount of light detected at the center light receiving area 41a is turned into a variation in expansion/contraction of the scanner 1 in the Z direction. Since a variation in a difference between any adjacent light amounts at the marginal light receiving areas 41b, . . . , 41e is turned into an X displacement and Y displacement, an image is formed using the light amount detected at the center light receiving surface as an uneven signal on the sample surface and the differences of those light amounts at the X-symmetrical light receiving areas and Y-symmetrical light receiving areas as X signal and Y signal. By so doing it is possible to obtain accurate three-dimensional information.

FIG. 7A shows a state when a sample is scanned in a "+X" direction; FIG. 7B, a state when the sample is at a scanning center position; and FIG. 5C, a state when the sample is scanned in a "−X" direction, as viewed from the respective Figures.

As shown in FIGS. 7A to 7C, as scanning is performed, the focused light spot 42 is moved on the light receiving surface of the photodetector 32a and there occurs a variation in amount of light, P, received at the respective marginal light receiving areas 41b to 41e. At this time, if a respective amount of light, P, at the respective marginal light receiving areas 41b . . . 41e is given by Pa, . . . Pe, respectively, and if $$Px=(Pb+PC)-(Pd+Pe) \qquad (5)$$

then a relation given below is established px1<Px2<px3 (6) provided that the magnitudes of Px in the states of FIGS. 7A to 7C are represented by Px1 to Px3.

At this time, the X direction displacement can be expressed by Px above. The Y direction displacement is also found in similar way. As a result, it is possible to detect a two-dimensional direction displacement from a variation of a calculated value corresponding to the amounts of light at the marginal light receiving areas 41b . . . 41e which are received at the photodetector 32a of the scanner 1. Like the case of the second embodiment, the Z direction displacement of the scanner 1 can be detected by detecting a variation in amount of light at the center light receiving area 41a.

As in the case of the first embodiment, a scanner system of a fifth embodiment using an optical type displacement sensor with a plane mirror provided on a stage will be explained below with reference to FIGS. 9 and 10.

Figure 9:
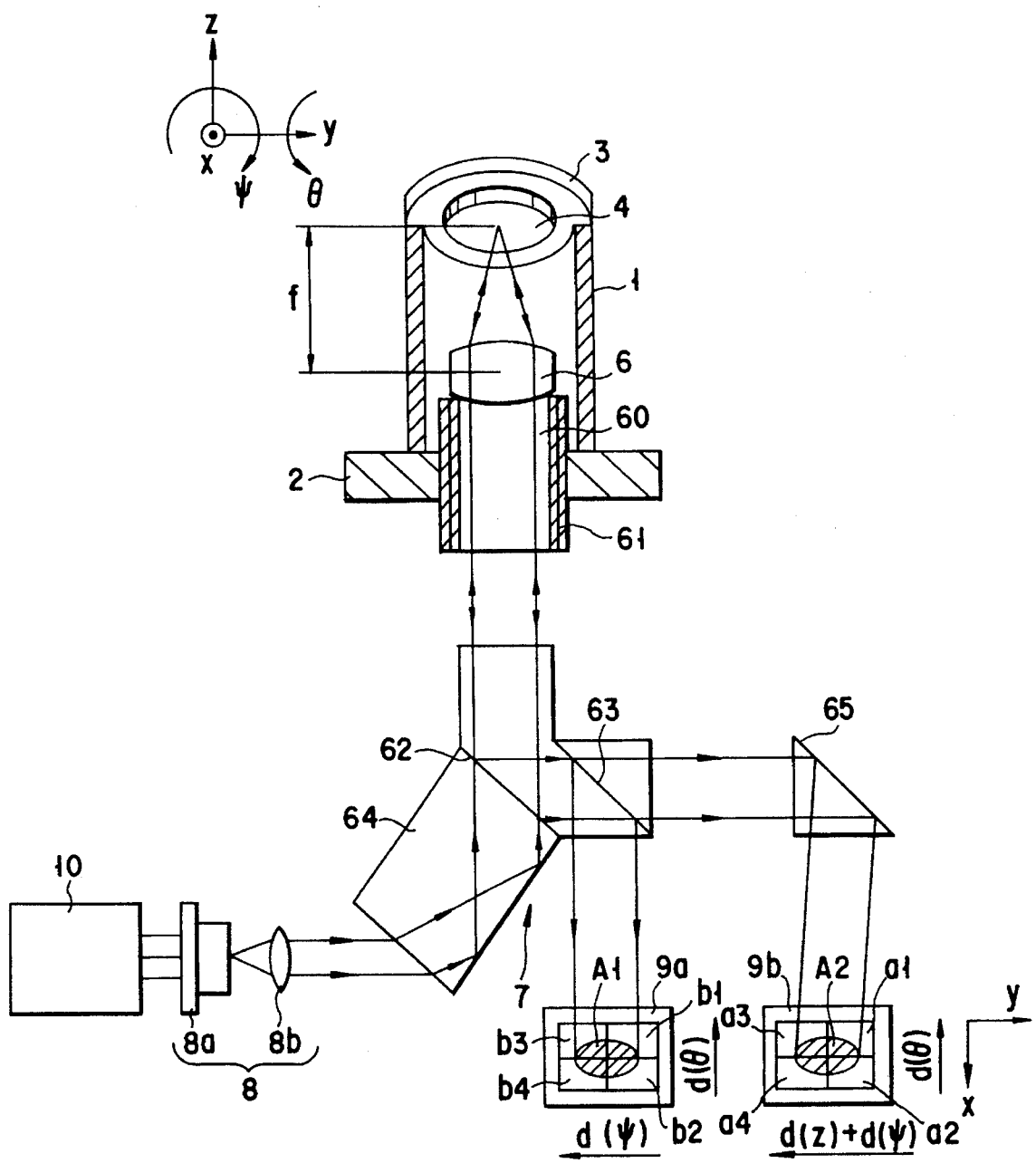
FIG. 9 is a view showing a scanner system according to a fifth embodiment of the present invention.
Figure 10:
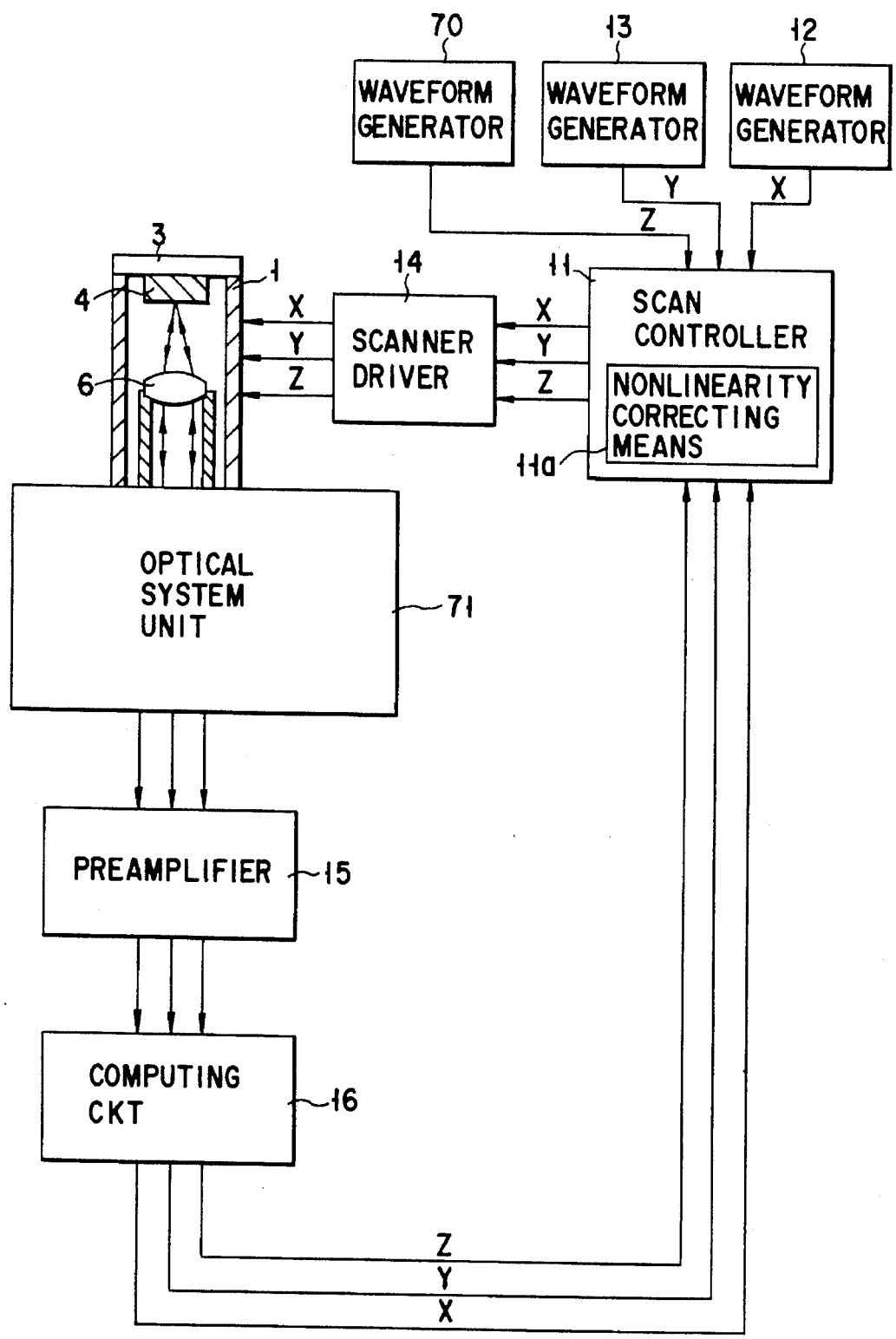
FIG. 10 is a diagrammatic view showing a scanning type probe microscope used in the scanner system of FIG. 9.

As shown in FIG. 9, a tube-like lens holding mechanism 60 is provided in the optical type displacement sensor of this embodiment such that the lens holding mechanism is projected via the fixed base 2 into a scanner 1. A collimator lens 6 is provided on the upper end of the mechanism 60 with a predetermined distance left relative to a plane mirror 4 in an opposed relation. A lens position adjusting mechanism 61 is provided in the lens holding mechanism 60 relative to the scanner 1 such that the mechanism 60 can be movably adjusted in an up/down direction in a coaxial relation to the scanner 1. By the mechanism 61 the distance of the collimator lens 6 is adjustably so set relative to the plane mirror 4 that the focal point of the lens 6 is on the plane mirror 4.

A beam splitter 7 is arranged below the lens holding mechanism 60. A light source 8 is located on the lateral side of the beam splitter 7 and comprises a semiconductor laser 8a driven by an LD driver 10 and a collimator lens 8b for allowing light which exits from the laser to be shaped as parallel beams.

The beam splitter 7 comprises an unconventional-shaped prism 64 having a reflection surface for receiving the parallel beams from the collimator lens 8b and vertically reflecting them upwardly, a first half-mirror 62 for allowing the reflected beam to be transmitted and those reflected beams which come from the plane mirror 4 to be vertically reflected, and a second half-mirror 63 for allowing the light beams which are reflected from the first half mirror 62 to be separated into transmitted and reflected beams.

A critical angle prism 65 is arranged on the transmission side of the second half mirror 63 and has a reflection surface so set as to obtain a substantially critical angle relative to reflected beams coming from the second half mirror 63.

First and second position detectors 9a and 9b are arranged on those sides opposite to those of the second half mirrors 63 and critical angle prism 65, respectively, and comprised of photodiodes. These position detectors 9a and 9b have their light receiving surfaces, respectively, divided into four light receiving areas b1, . . . , b4 and a1 . . . a4 as shown in FIG. 9.

The operation of the scanner system thus arranged will be explained below.

The scanner 1 is driven by selectively applying voltage to four electrodes of the scanner 1. At this time, an elliptical parallel light exiting from the light source 8 is shaped into a true circle beam and reflected upwardly by the prism 64. The reflecting parallel beam is transmit the first half mirror 62 and are incident into the collimator lens 6 while passing through the lens holding mechanism 60. The beam incident in the collimator lens 6 is focused onto the surface of the plane mirror 4 mounted on a stage 3 and reflected. The reflected beam is converted by the collimator lens 6 to a parallel beam and enters the first half mirror 62 where the parallel beam is reflected. The reflected beam enters the second half mirror 63 as an incident beam. The incident beam is divided into first and second beams, the first beam reflected by the second half mirror 63 and incident onto the first position detector 9a. The first beam forms a first condensing light spot A1 on a light receiving surface of the detector 9a, and the second beam is transmitted and then reflected by the critical angle prism 65 and then incident onto the second position detector 9b to form a second condensing light spot A2 on a light receiving surface.

Even in this embodiment, the X and Y direction displacements of the scanner 1 are detected as a displacement of a focused light spot on the position detector with the use of the same principle as that in the first embodiment. In this case, on the first and second position detectors 9a and 9b the focused light spots A1 and A2 are formed with the same amount of light and same displacement $d(\phi)$, but when a Z-direction displacement is involved an amount of light for the focused light spot A2 on the second position detector 9b varies. The reason for this will be set out below.

Since the position of the plane mirror 4 is displaced from the focal position of the collimator lens 6, the amount of light reflected by the critical angle prism 65 varies in accordance with the Z-direction displacement of the plane mirror 4. As a result there occurs a variation in amount of focused light spot A2 incident on the second position detector 9b and, if that amount of light is found, it is possible to know the Z-direction variation. Detecting the optical-axis displacement using such a critical angle is known, for example, in Jpn Pat. Appln. KOKAI Publication No. 56-7246.

When, for example, the scanner 1 is displaced in the +Z direction, the focused light spot A2 of the light incident on the second position detector 9b after being reflected by the critical angle prism 65 is such that amounts of light at the a1 and a2 side portions are decreased relative to a center and amounts of light at the a3 and a4 side portions are not varied to provide a true cycle pattern. By thus measuring the difference d(z) for the light amount distribution on the true-circle focused light spot on the second position detector 9b it is possible to detect the Z direction displacement of the scanner 1.

In this embodiment it is possible to detect the respective displacements in the X, Y, and Z directions on the aforementioned principle. However, the influence of each direction displacement on the displacement detection in other direction displacements can be disregarded as will be set out below.

Regarding the Influence of the XY Displacement on the Z Displacement Detection:

The critical angle of the critical angle prism 65 relative to the incident light beam corresponds to an angle in a plane parallel to a drawing surface and is subject to an influence by an angle variation $\phi$ of the scanner 1 in the drawing surface but is not influenced by the angle variation $\theta$ of the scanner 1 in a plane perpedicular to the drawing surface. It is, therefore, only necessary to consider the influence alone of the angle variation $\phi$ for the former. That is, when the scanner 1 is displaced in the X, Y and Z directions at a time, the Y direction displacement of the focused light spot A2 on the second position detector 9b contains information on the Z direction displacement and Y direction displacement of the scanner 1. The Y direction displacement of the focused light spot A1 on the first position detector 9a enables the detection of only the Y direction displacement of the scanner 1. It is possible to detect only the Z direction displacement of the scanner 1 by subtracting the output information of the first position detector 9a from the output information of the second position detector 9b as will be set out below. With B1 to B4 representing amounts of light received on the light receiving areas b1, . . , b4 of the first position detector 9a and A1 to A4, amounts of light received on the light receiving areas a1, . , a4 of the second position detector 9b, the Z direction displacement dz is given below:

$$dz=(A3+A4)-(A1+A2)$$
$$-K\{(B3+B4)-(B1+B2)\} \quad (7)$$

Here, K denotes a proper constant.

Regarding the Influence of the Z Displacement upon the XY Displacement Detection:

From the aforementioned principle, when the scanner 1 is displaced only in the X direction, the angle variation $\theta$ is involved and, at this time, the displacement $d(\theta)$ on the focused light spot A1 of the first position detector 9a is as shown in Equation (1) explained in conjunction with the first embodiment. Here, when the scanner 1 is displaced in the X and Y directions at a time, Equation (1) becomes $$d(\theta)=2\cdot(f+Z)\cdot\theta \quad (8)$$

Stated in more detail, since f and Z are on the order of 4 mm and 0.005 mm, respectively, d(θ) involves a variation of only about 0.1% compared with the case when there is no Z-direction variation. It is thus possible to disregard the influence of the Z direction displacement on the X direction displacement detection. The same thing can also be said of the influence of the Z direction displacement on the Y direction detection. Thus the X and Y direction displacements when the scanner 1 is displaced in the X, Y and Z directions at a time are found from the following equations:

$$X = (B1+B3) - B2+B4 \quad (9)$$

$$Y = (B3+B4) - B1+B2 \quad (10)$$

It is thus possible, in this embodiment, to optically monitor the three-dimensional position in the X, Y and Z directions of the scanner 1, that is, the stage 3, at all times.

A scanner system using the aforementioned optical type displacement sensor will be explained below with reference to FIG. 10. In FIG. 10, reference numeral 71 shows an optical system unit having the aforementioned beam splitter 7, light source 8 and first and second position detectors 9a, 9b. Measurement signals from the first and second position detectors 9a, 9b are amplified by a preamplifier 15 and input to a computing circuit 16. The computing circuit 16 computes associated input signals in accordance with Equations (7), (9) and (10) and finds the X, Y and Z direction displacements of the scanner 1. The computing processing information is input to a scan controller 11. A third waveform generator 70 for generating a Z direction reference voltage is connected to the input side of the scan controller 11 as in the case of first and second waveform generators 12 and 13. The scan controller 11 performs predetermined processing (processing for feedback control, rotating and displacing the motion of the scanner 1 in an XY plane, etc.,) on those X, Y and Z direction reference voltages generated from the first, second and third waveform generators 12, 13 and 70, respectively, and generates X, Y and Z direction control signals. These control signals are input to a scanner driver 14. The scanner driver 14 selectively applies voltage to the corresponding electrode of the scanner 1 so that the scanner 1 is displaced to a state designated by the corresponding control signal supplied.

Even in this embodiment, the scan controller 11 has a nonlinearity correcting means 11a for imparting a predetermined correction to the generated control signal on the basis of the displacement signal supplied from the computing circuit 16. This is the same as in the first embodiment.

Except for the addition of the Z direction displacement the AFM of the fifth embodiment performs the same operation as that of the fifth embodiment and it is possible to three-dimensionally control the state of the stage 3.

The use of the scanner system as shown in FIG. 9 controllably enables the position of an article which is fixedly set on the stage 3 to a three-dimensionally desired state. If, for example, a mirror is fixed to the upper surface of the stage 3, then the scanner system can be widely used for various purposes, such as controllably setting the θ, φ direction angle displacements, as well as the Z direction displacement, of the mirror at a desired state. It is self-evident that this embodiment achieve the advantage as explained in conjunction with the first embodiment.

A scanning type probe microscope (SPM) with the FIG. 10 scanner system applied thereto will be explained below with reference to FIG. 11.

In FIG. 11, reference numeral 80 shows a probe. The probe 80 can be displaced in the Z direction under an interaction with a sample 30, such as a tunneling current, frictional force, magnetic force and atomic force. The displacement is detected by a probe displacement sensor 81 and the output side of the probe displacement sensor 81 is connected to the input side of the scan controller 11. The output side of the computing circuit 16 is connected to a display device 82 for displaying an SPM image of the sample 30.

In the actual SPM measurement, feedback control is performed on the X and Y direction displacements alone of the scanner 1 with the use of a detection signal from an optical type displacement sensor and feedback control is performed on the z direction of the scanner 1 with the use of a corresponding detection signal from the probe displacement sensor 81. The scan controller 11 generates X and Y direction control signals on the basis of reference waveforms output from the first and second waveform generators 12 and 13, so that the stage 3 is displaced to a predetermined state. In this state, the nonlinearity control means 11a monitors the displacement signals supplied from the computing circuit 16 to find a deviation between a desired current state of the stage 3 and an actual stage of the stage 3 represented by X and Y displacement signals. The X and Y direction control signals are varied by the nonlinearty control means 11a so as to compensate for the deviation. That is, XY direction feedback control is performed so as to allow the actual scanning of the stage 3 which is found by the computing circuit 16 to correspond to a desired scanning.

By the aforementioned XY scanning way, the sample 30 is scanned by the probe 80. At that time, the probe 80 is displaced under an interaction acting between the sample 30 and the probe 80. This displacement is detected by the probe displacement sensor 81 and a corresponding displacement signal is supplied to the scan controller 11. At the same time, a reference signal is supplied from the third waveform generator 70 to the scan controller 11 so as to set the probe 80 in a desired state. The scan controller 11 finds a deviation between the probe displacement signal from the probe displacement sensor 81 and the reference signal from the waveform generator 70. Such a Z signal as to compensate for the deviation is supplied to the scanner 1 via the scanner driver 14. In order for the probe-to-sample interaction to become a fixed value in accordance with the reference signal output from the third waveform generator 70, the scanner 1 is displaced in the Z direction. Since the Z direction displacement is proportional to the probe-to-sample interaction, it is possible to obtain an interaction distribution state as an SPM image, provided that the Z direction displacement is given by the optical system unit 71.

The display method of the SPM image will be explained below.

During the SPM measurement as set out above, the X and Y signals obtained by the computing circuit 16 show the position of the sample 30 relative to the probe 80 and the Z signal shows the interaction acting between the probe 80 and the sample 30. These signals are fed to the SPM image display device 82 where they are displayed as the SPM image.

The SPM image is obtained by directly monitoring the X, Y and Z direction displacements of the scanner 1 by means of the optical type displacement sensor. It is possible to obtain a three-dimensional distortionless image. At this time, the X and Y signals fed to the display device 82 are not those signals coming from the computing circuit 16 and the same result can be obtained even if the signals are fed from the waveform generators 12 and 13 to the display device. Therefore, the input side of the display device 82 may be connected to the output side of the waveform generators.

Figure 12:
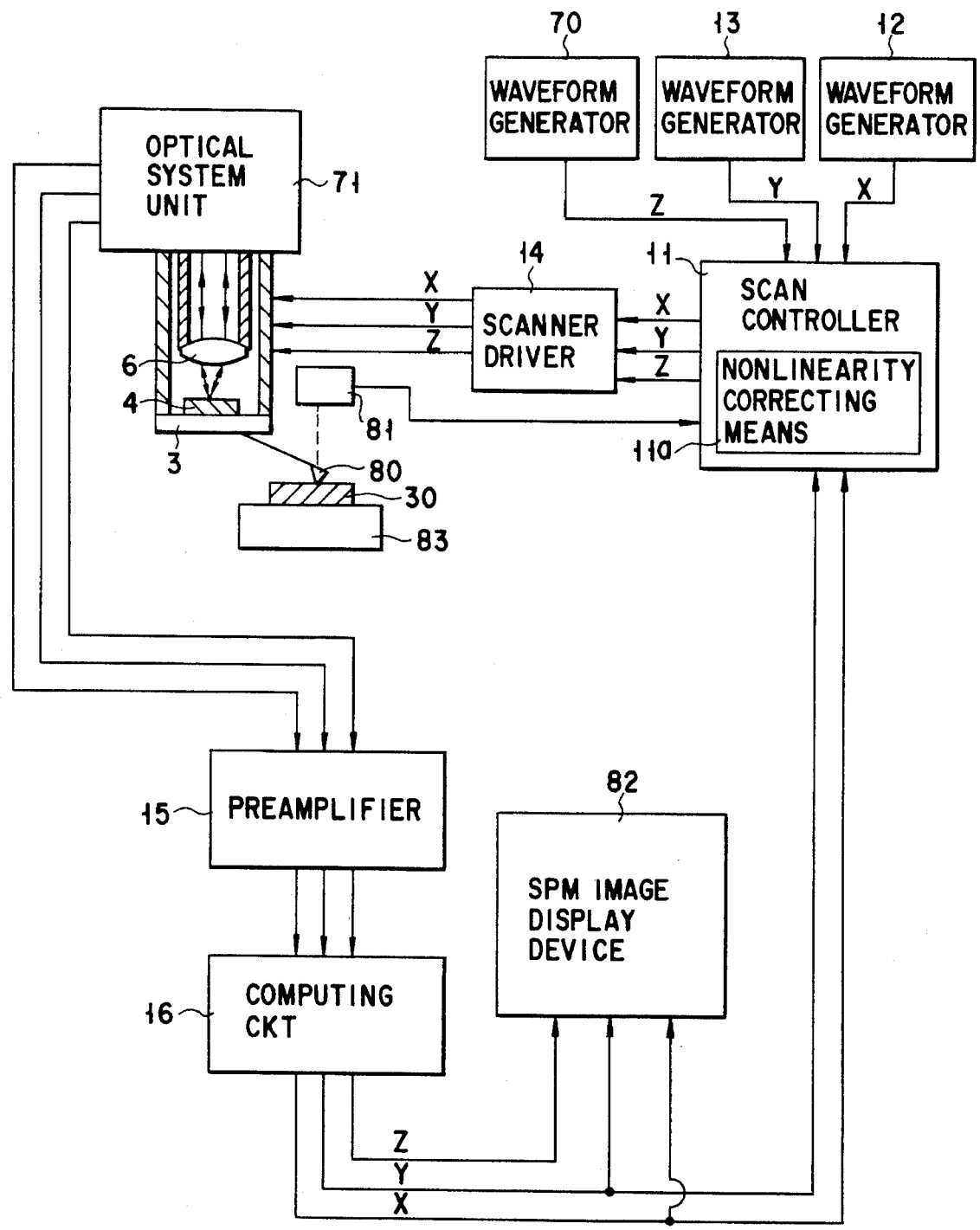
FIG. 12 is a diagrammatic view showing an apparatus according to a seventh embodiment applied to another atomic force microscope.

The scanning probe microscope (SPM) with a scanner system of a seventh embodiment applied thereto will be explained below with reference to FIG. 12.

In this embodiment a scanner 1 is of such a type that its top end is fixed to a fixed base, not shown, and its bottom end constitutes a free end. An optical system unit 71 is provided on the top end side and a stage 3 is provided on the bottom and side of the scanner 1. A plane mirror 4 is fixed to the upper surface of the stage 3 and a light beam incident on the optical system unit 71 via a collimator lens 6 is reflected by the plane mirror 4 toward an optical system unit 71. As in the case of the sixth embodiment, the optical system unit 71 detects the displacement of the scanner 1 from the reflection beam and delivers corresponding data to a preamplifier 15.

A probe 80 has its base end mounted on the lower surface of the stage 3 with the lower surface of the probe down. A sample base 83 is provided on the lower side but near the tip of the probe 80. A sample 30 is supported on the upper surface of the sample base 83 with a very narrow space left relative to the tip end of the probe 80.

Even in this embodiment it is possible to obtain a distortionless SPM image through the SPM measurement as in the case of the fifth embodiment. The seventh embodiment has an advantage in that it is possible to perform SPM measurement of a sample larger than that not possible even use is made of such a probe scan type SPM as in the fifth embodiment. It is also possible to correct any three-dimensional distortion in an SPM image when the SPM measurement is made on such a larger sample.

An SPM apparatus of an eighth embodiment will be explained below with reference to FIG. 13.

The eighth embodiment is substantially the same as the fifth embodiment shown in FIG. 11 except that no feedback control is made for the XY scanning of the scanner 1. That is, the scanner 1 is open controlled by X and Y reference signals output from first and second waveform generators 12 and 13. As in the case of the fifth embodiment, the Z direction displacement of the scanner 1 is feedback-controlled based on a probe displacement sensor 81 and, at the same time, the X and Y signals corresponding to XY coordinates on a sample 30 relative to a probe 80, as well as a scanner's Z displacement on the XY coordinates, are supplied from a computing circuit 16 to an SPM image display device 82. The Z displacement signal corresponds to, as in the case of the fifth embodiment, a signal proportional to a probe-to-sample interaction.

Even in the apparatus of the eighth embodiment, the interaction acting on the probe 80 at the X and Y positions is supplied as information to an SPM image display device 82. If the information on the interaction acting on the probe 80 is mapped, by the SPM image display device 82, in accordance with the X and Y position information of the probe 80, then it is possible to obtain such a distortionless SPM image as in the fifth embodiment.

The eighth embodiment of the present invention is simple in arrangement because it is simple in arrangement because it is not necessary to provide any nonlinear control means for the X and Y directions of the scanner 1.

Figure 14A:
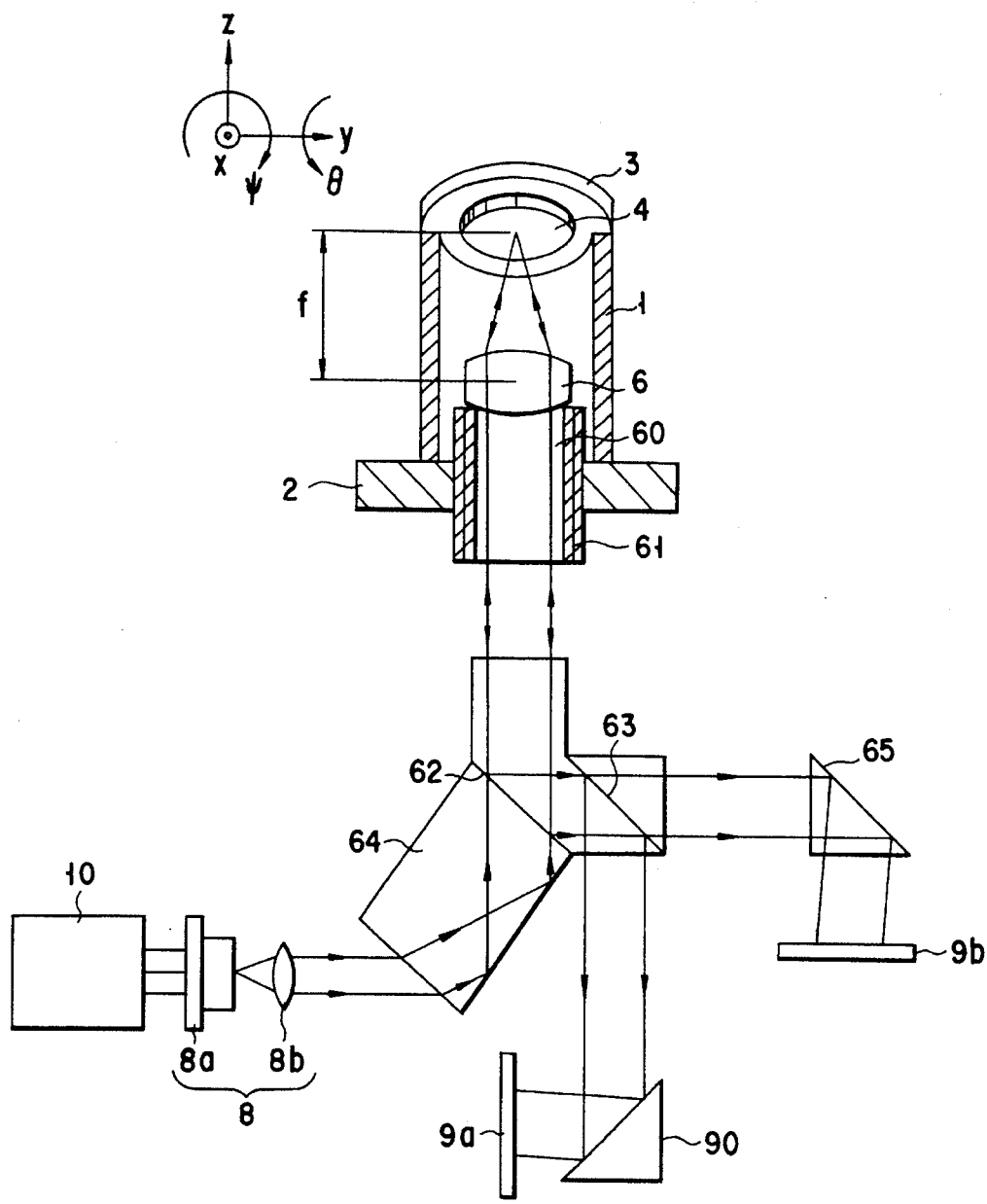
FIGS. 14A to 14C are diagrammatic views showing an apparatus applied to another atomic force microscope.
Figure 14B:
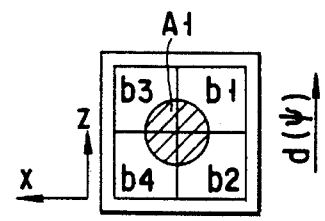
Figure 14C:
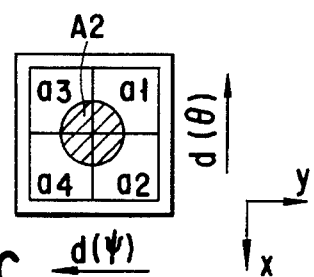

An apparatus of a ninth embodiment will be explained below with reference to FIG. 14.

The apparatus of this embodiment is substantially similar to the fifth embodiment shown in FIG. 9 except that a critical angle prism 90 is additionally provided between a first position detector 9a and a second half mirror 63 in an optical type displacement sensor. Since, in this arrangement, the light beams separated by a half mirror 63 passes through the critical angle prisms 65 and 90, respectively, a focused light spot A1 on the first position detector 9a and a focused light spot A2 on a second position detector 9b are similar to each other in their light amount and position. For this reason, this embodiment is advantageous in that an error when the output signals of the position detectors 9a and 9b are computed becomes zero theoretically.

Detecting the X, Y and Z direction displacements of the scanner 1 will be explained below.

The displacement of the second focused light spot A2 on the second position detector 9b when the scanner 1 is displaced in the $\phi$ and $\theta$ directions, as well as the variation of a light amount distribution of the second focused light spot A2 when the scanner 1 is displaced in the Z direction, is the same as that of the fourth embodiment. With $d(\phi)$ and $d(\theta)$ representing the displacements of the second focused light spot when the scanner 1 is displaced in the $\phi$ and $\theta$ directions and $d(z)$, a difference of second right and left light amount distributions when the scanner 1 is displaced in the Z direction, it is possible to find $d(\phi)$, $d(\theta)$ and $d(z)$ by performing the following computations:

$$d(\phi)=(A3+A4)-(A1+A2) \quad (11)$$

$$d(\theta)=(A1+A3)-(A2+A4) \quad (12)$$

$$d(z)=(A3+A4)-(A1+A2) \quad (13)$$

From Equations (11) and (13), $$d(\phi)+d(z)=2\{(A3+A4)-(A1+A2)\} \quad (14)$$

The position and light amount distribution of the focused light spot on the first position detector 9a are similarly varied for the $\phi$, $\theta$ and Z direction displacements and $d(\phi)$, $d(\theta)$ and $d(z)$ are given below:

$$d(\phi)=(B2+B4)-(B1+B3) \quad (15)$$

$$d(\theta)=(B1+B2)-(B3+B4) \quad (16)$$

$$d(z)=(B1+B3)-(B2+B4) \quad (17)$$

From Equations (15) and (17), $$d(\phi)-d(z)=2\{(B2+B4)-(B1+B3)\} \quad (18)$$

Further from Equations (14) and (18), $$2 \cdot d(\phi)=(A3+A4)-(A1+A2)$$
$$+(B2+B4) \quad (19)$$

and further from Equations (14) and (18), $$2 \cdot d(z)=2[(A3+A4)-(A1+A2)$$
$$-\{(B2+B4)-(B1+B3)\}] \quad (20)$$

From Equations (12) and (16), $$2 \cdot d(\theta)=(A1+A3)-(A2+A4)$$
$$+(B1+B2)-(B3+B4) \quad (21)$$

Here, since $d(\theta)$, $d(\phi)$ and $d(z)$ are proportional to the X, Y and Z direction displacements, $$x = (A1+A3)-(A2+A4)$$
$$+(B1+B2)-(B3+B4) \tag{22}$$
$$Y = (A3+A4)-(A1+A2)$$
$$+(B2+B4)-(B1+B3) \tag{23}$$
$$Z = (A3+A4)-(A1+A2)$$
$$-\{(B2+B4)-(B1+B3)\} \tag{24}$$

The X, Y and Z direction displacements of the scanner 1 can be detected from Equations (22), (23) and (24).

Since in this embodiment the critical angle prism 90 is additionally provided between the half mirror 63 and the first position detector 9a of the optical type displacement sensor, the amounts of focused light spots and positional variations on the position detectors 9a and 9b are made equal there and a zero error occurs theoretically as a result of computation on the outputs from the respective detectors. It is thus possible to achieve accurate measurement, an advantage of this embodiment.

The technique for providing the critical angle prism 90 between the second half-mirror 63 and the first position detector 9a in the optical type displacement sensor as in the apparatus of the ninth embodiment may be applied to the fifth to either embodiments.

Figure 15:
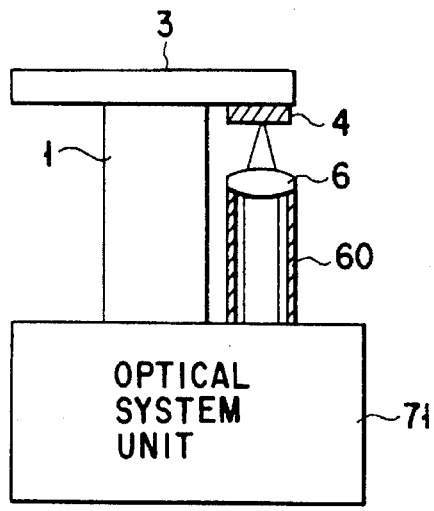
FIG. 15 is a view for explaining a variant of a scanner system according to the present invention.

Although in the aforementioned embodiments the measuring light beam for the measurement of the scanner displacement is guided in the cylindrical tube-like scanner 1 so as to reduce the size of the apparatus as a whole, the present invention is not restricted to the arrangement as shown above. As shown in FIG. 15, the plane mirror 4 may be mounted on the lower surface of a stage 3 such that it is loaded outside the scanner 1. In this case, the collimator lens 6 and optical system unit 71 may be located outside the scanner 1 so that the component parts can readily arranged, checked and repaired. Even in this case, the plane mirror 4 may be mounted not only on the lower side of the stage 3 but also on the upper surface of the stage 3 in which case a corresponding optical system unit 71 is located over the stage.

Figure 16:
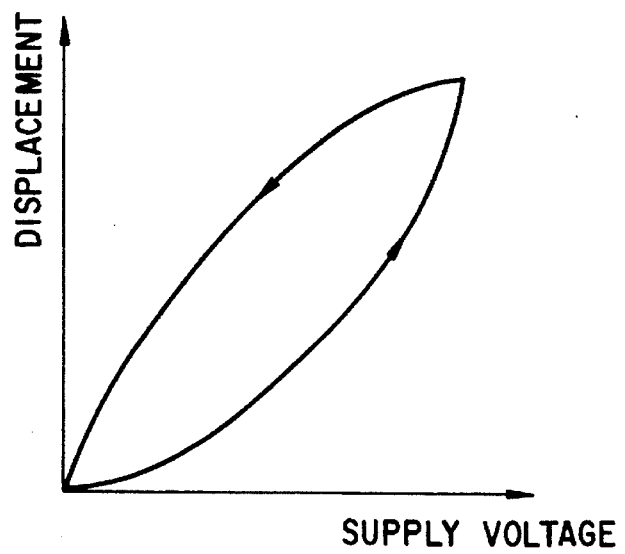
FIG. 16 is a graph showing a relation of a supply voltage to a piezoelectric body to the displacement of the piezoelectric body on a conventional apparatus.

FIG. 16 shows a relation between the supply voltage to the piezoelectric body and the displacement of the piezoelectric body when the displacement of the piezoelectric body of which the scanner is composed (a basic concept of the present invention) is not corrected. From this Figure it will be seen that the piezoelectric body is not distorted with an increase or decrease in the supply voltage. Although in the aforementioned embodiments the probe is employed as a scanning member, any proper forms can be employed in accordance with the kinds of microscopes, such as a member having an opening through which an electron beam, ultrasonic beam or light beam is passed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A scanner system comprising:

a scanning member arranged opposite a sample;

scanning means having a free end displaceable at least in X and Y directions and supporting one of the scanning member and sample on that free end, and a measurement point set on the free end side, the scanning means having a voltage-displacement nonlinear characteristic;

means for applying voltages to the scanning means and for displacing one of the scanning member and sample on the free end of the scanning means relative to the other in the X and Y directions;

optical displacement detecting means for enabling displacements of the measurement point which correspond to the X and Y direction displacements at the free end of the scanning means to be optically detected after a light beam has been incident on the measurement point via the scanning means and for producing displacement signals corresponding to these displacements; and correction signal supplying means for computing correction signals based on the displacement signals so as to apply voltages which correct the voltage-displacement nonlinear characteristic of the scanning means to the scanning means and for supplying them to the voltage applying means.

2. The scanner system according to claim 1, wherein the optical displacement detecting means has means for detecting displacements of substantially circular arcs with one point of the fixed end side of the measurement point as a center, the displacements of circular arcs corresponding to the X and Y displacements of the free end of the scanning means.

3. The scanner system according to claim 2, wherein:

the scanning means includes a tube scanner having an XY direction displaceable free end and a fixed end and support means having a first surface for supporting one of the sample and scanning member and a second surface confronting the fixed end of the tube scanner and tiltable at tilt angles corresponding to the X and Y direction displacements on the free end of the tube scanner;

the optical displacement detecting means includes a reflection mirror having the set measuring point and a reflection surface confronting the fixed end of the tube scanner and fixed to a second surface of the support means, means for enabling a light beam to be incident on the reflection surface of the reflection mirror through the tube scanner, and photodetector means for receiving a light beam reflected from the reflection surface and for outputting displacement signals corresponding to the tilt angles on the basis of a variation in a displacement amount of the reflected light beam; and the correction signal supplying means has computing means for computing the displacement signals corresponding to the tilt angles to obtain X and Y signals corresponding to the X and Y direction displacements at the free end of the tube scanner, and scan control means for applying to the tube scanner, voltages which correct the voltage-displacement nonlinear characteristic based on the X and Y signals.

4. The scanner system according to claim 3, wherein the photodetector means includes divided light receiving means, having a plurality of light receiving areas, for outputting displacement signals corresponding to the tilt angles by comparing those associated amounts of light beams at the light receiving areas.

5. The scanner system according to claim 3, wherein the optical displacement detecting means further includes a collimator optical member, disposed within the tube scanner, for allowing the light beam which passes through the tube scanner to be incident on the reflection surface of the reflection mirror.

6. The scanner system according to claim 3, further comprising:
light dividing means for dividing the light beam reflected from the reflection surface into two directions; and
second photodetector means for receiving the divided light beams so as to output displacement signals, including Z direction displacement signals of the scanning means, in accordance with the change of associated amounts of the light beams.

7. The scanner system according to claim 6, wherein the second photodetector means includes divided light receiving means, having a plurality of light receiving areas, for outputting the displacement signals of the measurement point, including the Z direction displacement signals of the scanning means, by comparing associated amounts of light beams received at the light receiving areas.

8. A scanner system according to claim 7, which further includes a critical angle prism means that directs at least one of the divided light beams to the photodetector means.

9. The scanner system according to claim 1, wherein the scanning member has a probe.

10. A scanner system according to claim 1, wherein said scanning member includes a probe, and further comprising:
probe displacement detecting means for detecting a Z direction displacement of the probe caused by interaction between the probe and the sample;
feedback control means for feedback controlling the scanning means in said Z direction in accordance with displacement signals output from the probe displacement detecting means; and
sensing means for sensing displacement of the measurement point, including the Z direction displacement of the free end of the scanning means, so as to output displacement signals of the measurement point.

11. The scanner system according to claim 10, wherein the sensing means optically senses displacement of the measuring point and includes divided light receiving means, having a plurality of light receiving areas, for outputting the displacement signals of the measurement point, including the Z direction displacement signals of the free end of the scanning means, by comparing associated amounts of light beams received at the light receiving areas.

12. The scanner system according to claim 1, further comprising sensing means for optically sensing displacement of the measurement point, including a Z direction displacement of the free end of the scanning means, so as to output displacement signals of the measuring point.

13. The scanner system according to claim 12, wherein the sensing means includes divided light receiving means, having a plurality of light receiving areas, for outputting the displacement signals of the measurement point, including the Z direction displacement of the free end of the scanning means, by comparing associated amounts of light beams at the light receiving areas.

14. A scanner system comprising:
a scanning member arranged opposite a sample;
scanning means having a free end displaceable at least in X and Y directions and supporting one of the scanning member and sample on that free end, and a measurement point set on the free end side, the scanning means having a voltage-displacement non-linear characteristic;
means for applying voltages to the scanning means and for displacing one of the scanning member and sample on the free end of the scanning means relative to the other in the X and Y directions;
optical displacement detecting means for enabling displacements of the measurement point which correspond to the X and Y direction displacements at the free end of the scanning means to be optically detected after a light beam has been incident on the measurement point and for producing displacement signals corresponding to these displacements; and
correction signal supplying means for computing correction signals based on the displacement signals so as to apply voltages which correct the voltage displacement non-linear characteristic of the scanning means to the scanning means and for supplying them to the voltage applying means.

15. The scanner system according to claim 14, wherein the optical displacement detecting means has means for detecting displacements of substantially circular arcs with one point of the fixed end side of the measurement point as a center, the displacements of circular arcs corresponding to the X and Y displacements of the free end of the scanning means.

16. The scanner system according to claim 15, wherein:
the scanning means includes a tube scanner having an XY direction displaceable free end and a fixed end and support means having a first surface for supporting one of the sample and scanning member and a second surface confronting the fixed end of the tube scanner and tiltable at tilt angles corresponding to the X and Y direction displacements on the free end of the tube scanner;
the optical displacement detecting means includes a reflection mirror having the set measuring point and a reflection surface confronting the fixed end of the tube scanner and fixed to a second surface of the support means, means for enabling a light beam to be incident on the reflection surface of the reflection mirror through the tube scanner, and photodetector means for receiving a light beam reflected from the reflection surface and for outputting displacement signals corresponding to the tilt angles on the basis of a variation in a displacement amount of the reflected light beam; and
the correction signal supplying means has computing means for computing the displacement signals corresponding to the tilt angles to obtain X and Y signals corresponding to the X and Y direction displacements at the free end of the tube scanner, and scan control means for applying, to the tube scanner, voltages which correct the voltage-displacement non-linear characteristic based on the X and Y signals.

17. The scanner system according to claim 16, wherein the photodetector means includes divided light receiving means, having a plurality of light receiving areas, for outputting displacement signals corresponding to the tilt angles by comparing those associated amounts of light beams at the light receiving areas.

18. The scanner system according to claim 16, wherein the optical displacement detecting means further includes a collimator optical member, disposed within the tube scanner, for allowing the light beam which passes through the tube scanner to be incident on the reflection surface of the reflection mirror.

19. The scanner system according to claim 16, further comprising:
light dividing means for dividing the light beam reflected from the reflection surface into two directions; and second photodetector means for receiving the divided light beams so as to output displacement signals, including Z direction displacement signals of the scanning means, in accordance with the change of associated amounts of the light beams.

20. The scanner system according to claim 19, wherein the second photodetector means includes divided light receiving means, having a plurality of light receiving areas, for outputting the displacement signals of the measurement point, including the Z direction displacement signals of the scanning means, by comparing associated amounts of light beams received at the light receiving areas.

21. A scanning system according to claim 20, which further includes a critical angle prism means which directs at least one of the divided light to the photodetector means.

22. A scanner system according to claim 14, wherein said scanning member includes a probe, and further comprising:

probe displacement detecting means for detecting a Z direction displacement of the probe caused by interaction between the probe and the sample;

feedback control means for feedback controlling the scanning means in said Z direction in accordance with displacement signals output from the probe displacement detecting means; and sensing means for sensing displacement of the measurement point, including the Z direction displacement of the free end of the scanning means, so as to output displacement signals of the measurement point.

23. The scanner system according to claim 22, wherein the sensing means optically senses displacement of the measuring point and includes divided light receiving means, having a plurality of light receiving means, for outputting the displacement signals of the measurement point, including the Z direction displacement signals of the free end of the scanning means, by comparing associated amounts of light beams received at the light receiving areas.

24. The scanner system according to claim 14, further comprising sensing means for optically sensing displacement of the measurement point, including a Z direction displacement of the free end of the scanning means, so as to output displacement signals of the measuring point.

25. The scanner system according to claim 24, wherein the sensing means includes divided light receiving means, having a plurality of light receiving areas, for outputting the displacement signals of the measurement point, including the Z direction displacement of the free end of the scanning means, by comparing associated amounts of light beams at the light receiving areas.

* * * * *